United States Patent
Das et al.

(10) Patent No.: US 10,394,293 B2
(45) Date of Patent: Aug. 27, 2019

(54) METHOD FOR PREVENTING OVER-HEATING OF A DEVICE WITHIN A DATA PROCESSING SYSTEM

(71) Applicant: LENOVO ENTERPRISE SOLUTIONS (SINGAPORE) PTE. LTD., Singapore (SG)

(72) Inventors: Himansu S. Das, Taipei (TW); Steven C. Chou, Taipei (TW); Richard Huang, Taipei (TW); Jeff Lin, Taipei (TW)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 374 days.

(21) Appl. No.: 14/100,558

(22) Filed: Dec. 9, 2013

(65) Prior Publication Data
US 2014/0181562 A1    Jun. 26, 2014

(30) Foreign Application Priority Data
Dec. 26, 2012  (TW) ............................. 101150068 A

(51) Int. Cl.
| G06F 1/32 | (2019.01) |
| G06F 1/20 | (2006.01) |
| G06F 1/3287 | (2019.01) |
| G06F 1/3246 | (2019.01) |

(52) U.S. Cl.
CPC ............... *G06F 1/206* (2013.01); *G06F 1/20* (2013.01); *G06F 1/32* (2013.01); *G06F 1/3246* (2013.01); *G06F 1/3287* (2013.01); *Y02D 10/16* (2018.01); *Y02D 10/17* (2018.01); *Y02D 10/171* (2018.01)

(58) Field of Classification Search
None
See application file for complete search history.

(56) References Cited

U.S. PATENT DOCUMENTS

| 5,848,282 A * | 12/1998 | Kang ...................... G06F 1/206 361/695 |
| 5,935,252 A * | 8/1999 | Berglund .................. G06F 1/20 710/104 |
| 6,300,750 B1 | 10/2001 | Oglesbee et al. |

(Continued)

FOREIGN PATENT DOCUMENTS

EP    2428948 A1    3/2012

OTHER PUBLICATIONS

Notification of the First Office Action in Taiwanese Patent Application No. 101150068, dated May 7, 2015, 26 pages.

*Primary Examiner* — Tanh Q Nguyen

(57) ABSTRACT

A method for providing over-heating protection of a target device within an information processing system is disclosed. A determination is made whether or not a power status of the information processing system is set to turn on a main power of a power supply device. If the power status of the information processing system is set to turn on a main power of a power supply device, a power switch of the target device is turned on; otherwise, another determining is made whether or not the target device is set to operate based on a user's setting. If the target device is set to operate based on the user's setting, the power switch of the target device is turned on; otherwise, the power switch of the target device is turned off.

9 Claims, 5 Drawing Sheets

(56) References Cited

U.S. PATENT DOCUMENTS

| | | | | |
|---|---|---|---|---|
| 6,519,663 | B1* | 2/2003 | Osten | G06F 13/4295 |
| | | | | 709/203 |
| 6,777,900 | B2* | 8/2004 | Lee | G06F 1/206 |
| | | | | 318/268 |
| 7,149,098 | B1 | 12/2006 | Chen | |
| 7,219,507 | B1* | 5/2007 | Flachs | H05K 7/20209 |
| | | | | 62/186 |
| 7,774,633 | B1* | 8/2010 | Harrenstien | G06F 1/24 |
| | | | | 713/300 |
| 8,250,382 | B2 | 8/2012 | Maglione et al. | |
| 8,358,103 | B2* | 1/2013 | Eastlack | H02J 7/025 |
| | | | | 320/108 |
| 2002/0188873 | A1* | 12/2002 | Berglund | G06F 1/28 |
| | | | | 713/300 |
| 2005/0210896 | A1* | 9/2005 | Durant | G06F 1/206 |
| | | | | 62/178 |
| 2007/0297893 | A1* | 12/2007 | Alon | F04D 25/166 |
| | | | | 415/47 |
| 2008/0003845 | A1* | 1/2008 | Hong | H05K 1/14 |
| | | | | 439/67 |
| 2010/0309491 | A1* | 12/2010 | Yasui | G06F 3/1204 |
| | | | | 358/1.6 |
| 2011/0226462 | A1* | 9/2011 | Sato | G06F 1/206 |
| | | | | 165/247 |
| 2012/0010754 | A1* | 1/2012 | Matteson | H05K 7/20836 |
| | | | | 700/282 |
| 2012/0084551 | A1 | 4/2012 | Cheng et al. | |
| 2012/0096187 | A1* | 4/2012 | Tsai | G06F 9/44505 |
| | | | | 710/5 |
| 2014/0181562 | A1* | 6/2014 | Das | G06F 1/3287 |
| | | | | 713/324 |

* cited by examiner

METHOD FOR PREVENTING OVER-HEATING OF A DEVICE WITHIN A DATA PROCESSING SYSTEM

PRIORITY CLAIM

The present application claims benefit of priority under 35 U.S.C. §§ 120, 365 to the previously filed Taiwan Patent Application No. 101150068 filed on Dec. 26, 2012, which is incorporated by reference herein.

BACKGROUND OF THE INVENTION

1. Technical Field

The present invention relates to electronic devices in general, and, in particular, to a method for preventing over-heating of an electronic device within an information processing system.

2. Description of Related Art

With the continued improvement and development of faster components used in information processing systems, the complexity of heat management for the components also increase. Incidentally, the effective heat management for information processing systems becomes a big challenge.

In general, the power status of an information processing system can typically be defined at least as follows:

S0: operational status, the actual status is in normal operation;

S1: first standby status, which will cut off the power for some peripheral devices, generally stopping power supply to hard disk and monitor, and so on, but still supplying power to central processing unit (CPU), fan memory, fan, and so on;

S2: second standby status, which will cut off the power for some peripheral devices, generally stopping power supply to hard disk, monitor, central processing unit, cache memory, and so on;

S3: suspend status, which will cut off the power for some peripheral devices, generally stopping power supply to hard disk, monitor, central processing unit, cache memory, and so on, but only supplying power to random access memory (RAM) for storing the operation status in the RAM;

S4: hibernate status, which will turn off the main portion of system power and store the operation status in the hard disk;

S5: soft off status, which will turn off all the power except the power management unit of the core chip; and G3: mech off status, which also turn off the power management unit of the core chip.

Thus, when the status of power supply is suspend status S3, soft off status S5, or hibernate status S4, the main power of the power supply device is turned off, but the standby power is still supplied to the target devices. As a result, the temperatures of various devices within an information processing system will continue to increase. Consequently, it would be desirable to prevent those devices from being damaged by over-heating.

SUMMARY OF THE INVENTION

In accordance with a preferred embodiment of the present invention, a determination is made whether or not a power status of an information processing system is set to turn on a main power of a power supply device, wherein the information processing system includes a target device. If the power status of the information processing system is set to turn on a main power of a power supply device, a power switch of the target device is turned on. If the power status of the information processing system is not set to turn on a main power of a power supply device, another determining is made whether or not the target device is set to operate based on a user's setting. If the target device is set to operate based on the user's setting, the power switch of the target device is turned on. If the target device is not set to operate based on the user's setting, the power switch of the target device is turned off.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
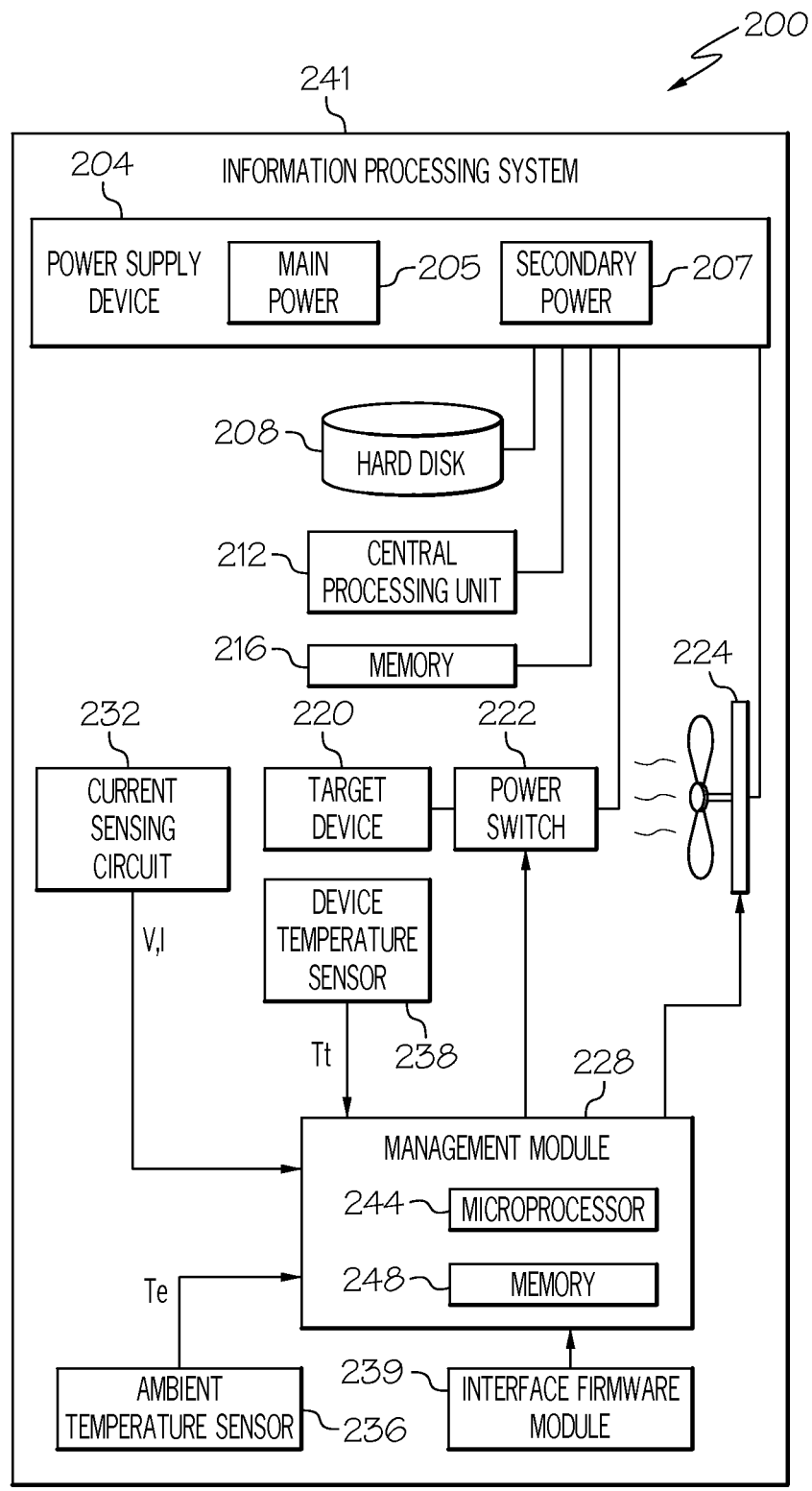
FIG. 1 is a block diagram of an information processing system, in accordance with a preferred embodiment of the present invention.

As will be appreciated by one skilled in the art, the present invention may be embodied as a computer system, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

According to the embodiments of the present invention, the hardware structure of an information processing system 200 is described with reference to the attached drawings starting from FIG. 1. The information processing system 200 includes a power supply device 204, a hard disk 208, a central processing unit 212, a memory 216, a target device 220, a fan 224, a management module 228, a current sensing circuit 232, a power switch 222, an ambient temperature sensor 236, a device temperature sensor 238, an interface firmware module 239 and a chassis 241.

In a preferred embodiment of the present invention, the interface firmware module 239 may be for example, but not limited to, a read only memory (ROM) with Extensible Firmware Interface (EFI), Universal Extensible Firmware Interface (UEFI), Basic Input/Output System (BIOS) or other interface. However, the present invention is not limited hereto.

In a preferred embodiment of the present invention, the power supply device 204 includes a main power 205 and a standby power 207. While not supplying power to the information processing system 200, the standby power 207 supplies the power to the components still needed to operate, such as, but not limited to, the target device 220, the fan 224, the management module 228, the current sensing circuit 232, the temperature sensor 236, the device temperature sensor 238 and the like. While supplying power to the information processing system 200, the main power 205 approximately supplies power to all the components.

In the specification, the target device is referred to as a device with large amount of heat generation during operation of the information processing system 200, which may be for example, but not limited to, a card or a board, such as a sub card or board, or an optional card or board. In a preferred embodiment of the present invention, the target device 220 may be a network card, which may be implemented for example a mezzanine card for supporting multiple communication related functions, such as Wake on LAN (WOL), Wake on MODEM, Wake on keyboard, Wake on clock, Wake on USB device and the like. In another embodiment of the present invention, the target device 220 may be a charging standby power of a device. The target device 220 may be configured with an indicator (not shown in the drawing, for indicating the working status). Of course, based on the actual requirement, the target device 220 may also be the aforementioned hard disk 208, memory 216, fan 224 and the like, or may be an interface card, battery, PCI card, etc. However, the present invention is not limited hereto, and the associated details will be described in details in the following sections.

Making an example of a network card 220 supporting WOL, WOL is a technique for realizing remote turn-on through local area network (LAN), for example, but not limited to, Ethernet. By WOL, the other party may issue a command to convert from the suspend status S3, the hibernate status S4 or the soft off status S5 to the operational status S0. In order to support the WOL function, the information processing system 200 usually is required to include a motherboard (not shown) supporting WOL and a network card 220 supporting WOL. The motherboard supporting WOL is provided with a WOL port, and the EFI, UEFI or BIOS of the interface firmware module 239 also has the associated setting, such as turning on or off the WOL function. The network card supporting WOL is coupled with the WOL port, such as using a cable or integrating the network port on the motherboard, or other similar manner, so that the network card may still obtain small amount of current from the power supply device of the computer while the computer is turned off (having the main power 205 turned off) for monitoring of network frames.

In other words, when the information processing system 200 is in suspend status S3, hibernate status S4 or soft off status S5, the network related devices within the information processing system 200 must be kept with power supply, such that the power supply may keep the network related devices having the minimum operational capability. Once it is determined that there is a network broadcast information coming from outside of the information processing system 200 to instruct for WOL, the circuit elements, such as motherboard and power supply device, inside the information processing system 200 will be notified to start the WOL procedure.

Figure 2:
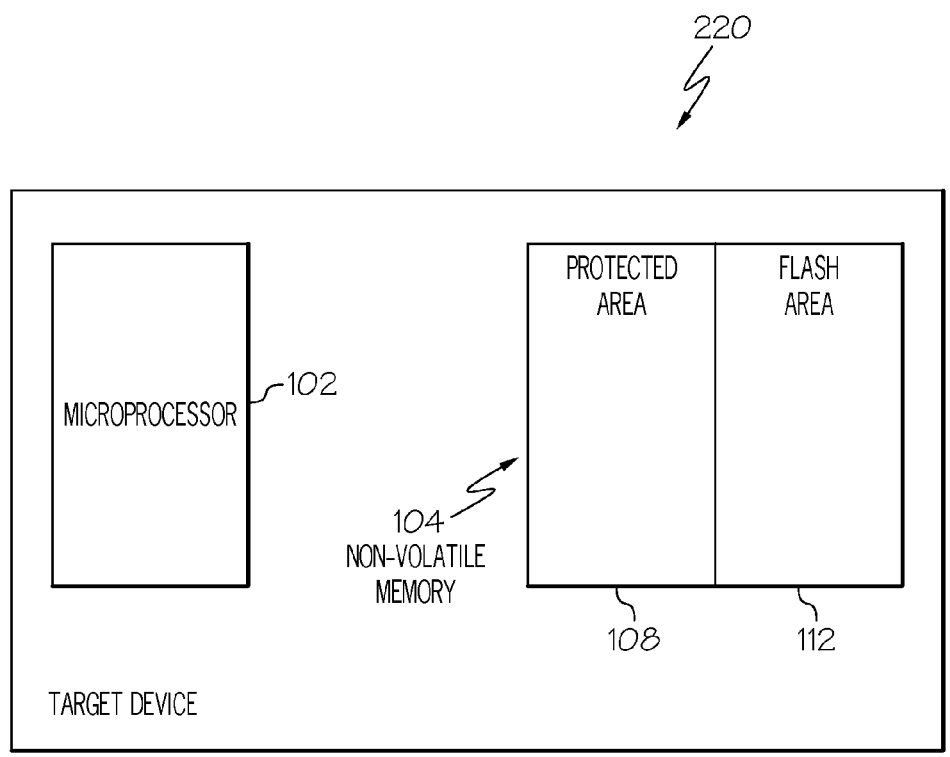
FIG. 2 illustrates the configuration of a non-volatile memory for the target device within the information processing system from FIG. 1.

With reference now to FIG. 2, the target device 220 includes a non-volatile memory 104. Preferably, the target device 220 further includes a micro-processor (MCU) 102. The non-volatile memory 104 may be for example, but not limited to, a flash ROM, a non-volatile electrically erasable programmable read only memory (EEPROM) and the like. Moreover, the non-volatile memory 104 includes the protected area 108 and the flash area 112. The protected area 108 is stored with un-erasable codes, for example, but not limited to, the vital product data (VPD), such as the information relating to manufacturing and parts. The general VPD includes the part number, the serial number, the product model number, the product version, the maintenance level, specific information of other device type and the like. Alternatively, the VPD may also include the user defined information.

As for the VPD of board components and system components as target device 220, during power-on-self-test (POST), POST will display its VPD. POST will also track its VPD to determine whether or not each device has the correct serial number. While replacing or removing a device, plugging a device or a device is over-heated or a device has a breakdown, the user will be alerted through an event log or warning message.

Referring back to FIG. 1, the power switch 222 may be for example, but not limited to, implemented with a plug-in card having a power switch thereon, or the power switch 222 may be implemented with a Metal Oxide Semiconductor Field Effect Transistor (MOSFET). However, the present invention is not limited hereto. The power switch 222 is electrically connected between the target device 220 and the management module 228. The management module 228 controls the ON or OFF of the power switch 222, and further controls the power supply for the target device 220, such as turning on or off the power supply of the target device 220). The associated control details are described in details in the following sections.

In an embodiment shown in FIG. 1, only the target device 220 has a fan 224. But, in other embodiments not shown, the hard disk 208, the CPU 212, and the memory 216 may have their individual corresponding fan to enhance the efficiency of heat dissipation. In order to clearly describe the present invention, only the target device 220 and a single fan 224 are used in the description. However, the skilled in the art may replace target device 220 with the hard disk 208, the CPU 212, the memory 216, a standby power of a device, or any other target device, which may generate heat and need to be cooled in the computer system.

The purpose of the fan 224 is to cool down aforementioned target devices 220. Preferably, the fan 224 is a so-called "smart fan," which has a microprocessor (not shown) to drive or manage the operation of the fan 224. For example, the microprocessor of the fan 224 can receive Pulse Width Modulation (PWM) signals and control the speed of the fan 224 according to the duty cycle in PWM signals. For the need of the exemplary embodiment, the microprocessor of the fan 224 may be modified based on the microprocessor AVR442 from Atmel Corporation, LB1860 from SANYO Semiconductor Co. Ltd., ZXBM200 from Zetex Semiconductors, etc. More details are provided as follows.

Regarding to the effective cooling performance of the fan 224, one of the technical points to be considered is the speed control of the fan 224. Except for fully ON/fully OFF, the operation method for controlling the fan 224 may still employ the pulse width modulation to control the fan operation, and by adjusting the difference of duty cycles in each unit time to control the speed of the fan 224.

Referring back to FIG. 1, the current detection circuit 232 provides a tiny resistance, such as 0.001Ω, for measuring the current I of the fan 224. And, the management module 228 may employ the measured current I to obtain the duty cycle in PWM signals for the fan 24. The skilled in the art may replace the target device 220 with the CPU 212, the memory 216, the hard disk 208 or any other target device in the information processing system 200 which will generate heat and need to be cooled, and measure the current actually dissipated by fans for cooling these devices for usage.

The ambient temperature sensor 236 is configured for detecting the temperature Te in the operating environment of the information processing system 200, i.e., the room temperature. The ambient temperature sensor 236 may employ a conventional digital thermal sensor, and directly generate a digital signal corresponding to the detected ambient temperature.

On the other hand, the device temperature sensor 238 is configured for detecting the temperature Tt of the target device 220. The device temperature sensor 238 may employ a conventional digital thermal sensor, and directly generate a digital signal corresponding to the detected device temperature.

In an embodiment, management module 228 comprises a microprocessor 244 and a memory 248, preferably implemented as a Baseboard Management Controller (BMC) on a motherboard (not shown) of the information processing system 200, such as VSC 452 BMC provided by Maxim Corporation or SE-SM4210-P01 BMC provided by Server Engines Corporation and could be further modified.

In another embodiment of the present invention, the management module 228 may be for example an Integrated Management Module (IMM). The composition of IMM is basically similar to a board management controller, which may includes an IMM firmware (not shown) for managing the information processing system 200, which is configured for replacing the BMC, and integrating the service processor functions, super I/O, video controller and remote capability into a chip (not shown) on the motherboard of the information processing system 200. On the other hand, the IMM firmware is the instruction and routine for executing the aforementioned functions. In an embodiment of the present invention, the management server module 228 may be referred to the iMM controller used in IBM™ products. In another embodiment, the management module 228 may employ the integrated lights-out (iLo) baseband management controller in Hewlett Packard[7] products. According to another embodiment, the management module 228 may refer to the Dell Remote Access Controller (DRAC) used in Dell™ products. Of course, the management module 228 may also be implemented as other independent controller.

In another embodiment of the present invention, based on the actual requirement, the management module 228 may further include a remote control program (not shown), and an Intelligent Platform Management Interface (IPMI) (not shown) utility program and the like.

In the embodiment, the management module 228 is provided with an A/D port (not shown) for receiving the current I detected by the current sensing circuit 232. The management module 228 is also provided with other A/D ports (not shown) for receiving the ambient temperature Te detected by the ambient temperature sensor 236 or the device temperature Tt detected by the device temperature sensor 238. Moreover, the management module 228 is also provided with a control signal output port for outputting the control signal to the fan 224, and further for setting the fan 224 or controlling the operation of the fan 224, for example, but not limited to, controlling the start, stop or the speed of the fan 224. For example, the management module 228 may output the pulse width modulation signals with different duty cycles to the microprocessor of the fan 224 as a speed control signal to control the speed of the fan 224.

Furthermore, if the fan 224 is a pulse width modulated fan, the management module 228 may output the pulse width modulation signals with different duty cycles to control the fan 224. Moreover, the memory 248 of the management module 228 may also be stored with the firmware required for controlling the fan and some associated parameters, such as the specific heat and density of air, the cross-sectional area of the target device 220 facing the air flow from the fan, various critical operation temperatures for target device 220, or other parameters.

Other basic architectures and components for the information processing system 200 may be referred to an ordinary personal computer or server, such as System X[7], Blade Center[7] or eServer[7] server from IBM Corporation. The details not related to the present invention will be omitted without description.

Figure 3:
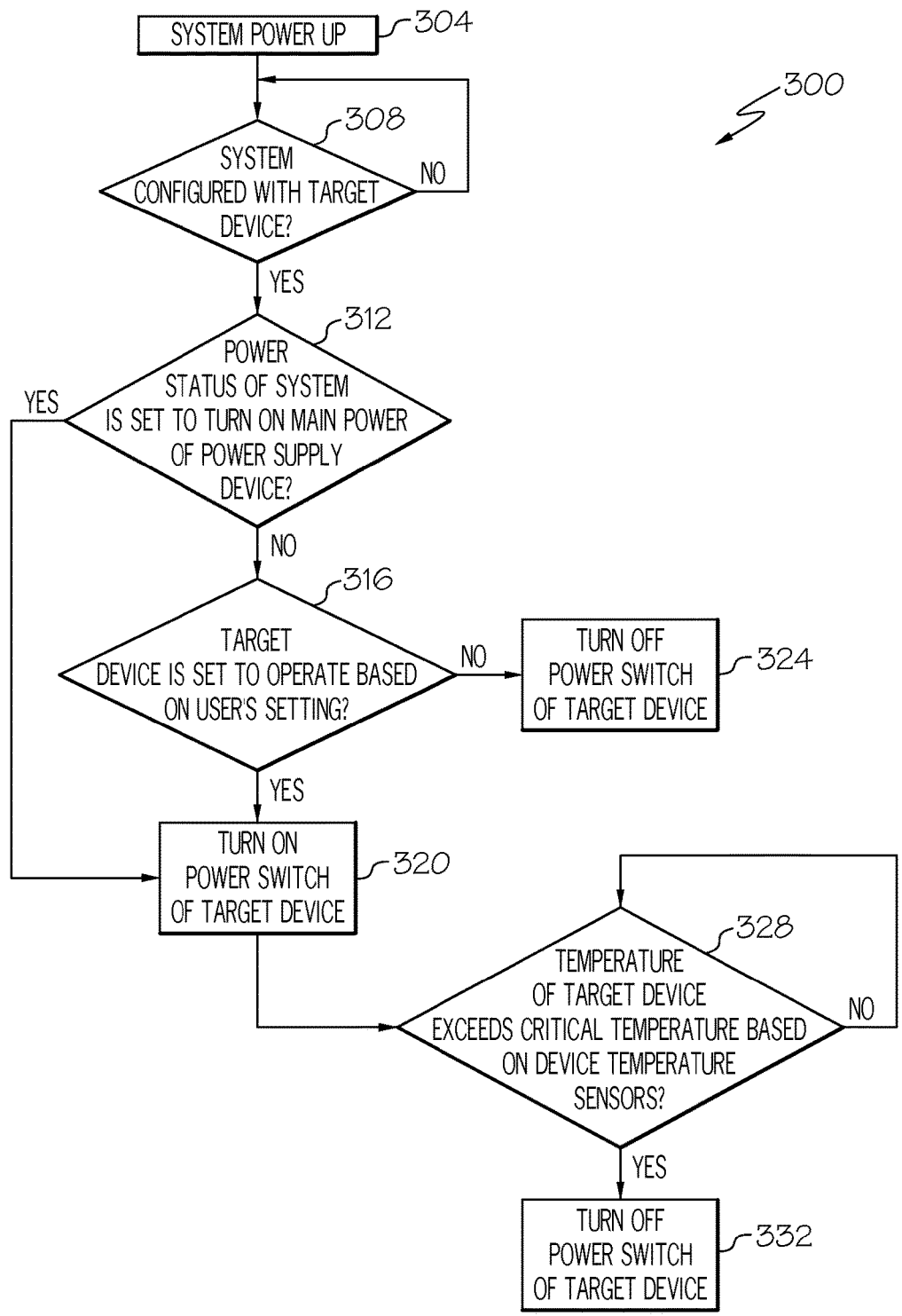
FIG. 3 is a high-level logic flow diagram of a method for preventing over-heating of a target device within an information processing system, in accordance with a preferred embodiment of the present invention.

The following description describes the fan recognition and control method of the present invention in association with the hardware structure shown in FIGS. 1 to 4A, 4B. FIG. 3 relates to a method 300 for preventing over-heating of target device 220 in the information processing system 200, in accordance with a preferred embodiment of the present invention. The method 300 includes the following steps:

Step 304: power up the information processing system 200 and turn on the AC power;

Step 308: management module 228 determines whether or not the information processing system 200 is configured with target device 220.

Step 312: if the information processing system 200 is configured with target device 220, the management module 228 determines whether or not the power status of the information processing system 200 is set to turn on the main power 205 of the power supply device 204. In a preferred embodiment of the present invention, based on the aforementioned definitions for power statuses, during operational status S0, first standby status S1, second standby status S2, the power status of the main power 205 is set to turn on; but during suspend status S3, hibernate status S4, soft off status S5, the power status of the main power 205 is set to turn off. If the power status of the main power 205 is Off, the power supply device 204 only supplies the secondary power 207, and next proceeds the step 316; if the power status of the main power 205 is On, then proceeds the step 320.

Step 316: at this time, the power supply device 204 only supplies the secondary power 207. The management module 228 may determine whether or not the target device 220 in the information processing system 200 is set to operate based on a user's setting. If the target device 220 is set to not operate, then proceed to step 324; if the target device 220 is set to operate, then proceed to step 320. In a preferred embodiment of the present invention, the management module 228 may determine whether or not the target device 220 is set to operate from the setting in the interface firmware module 239.

Step 320: the management module 228 turns on the power switch 222 of the target device 220.

Step 324: the management module 228 turns off the power switch 222 of the target device 220.

Step 328: the management module 228 determines whether or not the temperature of the target device 220 has exceeded the predetermined critical temperature based on the device temperature sensor 238. If the temperature of the target device 220 has not exceeded the predetermined critical temperature, then repeat the step 328. However, if the temperature of the target device 220 has exceeded the predetermined critical temperature, then proceed to step 332.

Step 332: the management module 228 turns off the power switch 222 of the target device 220.

Figure 4A:
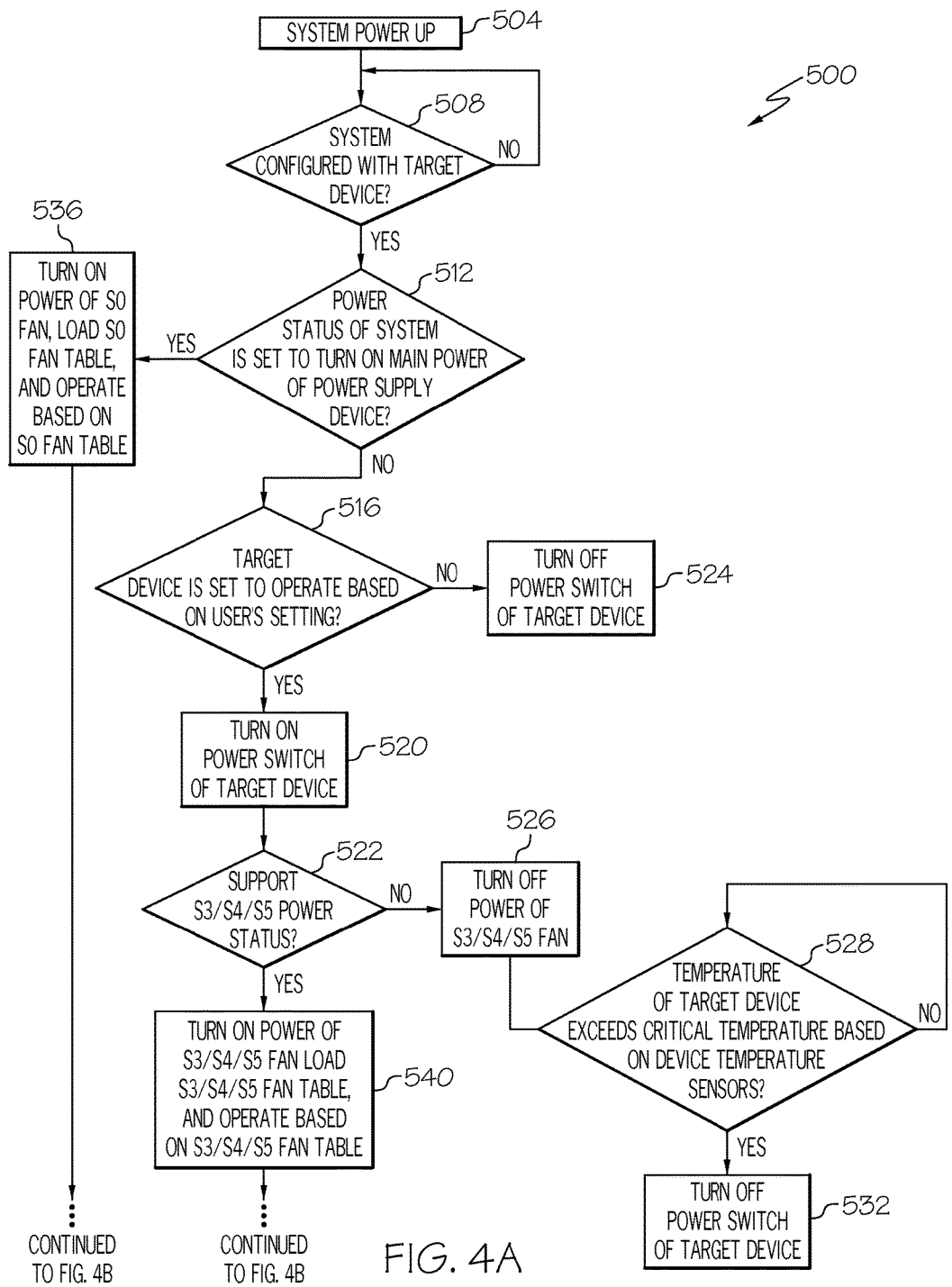
FIGS. 4A-4B are high-level logic flow diagrams of a method for preventing over-heating of a target device within an information processing system, in accordance with a second embodiment of the present invention.
Figure 4B:
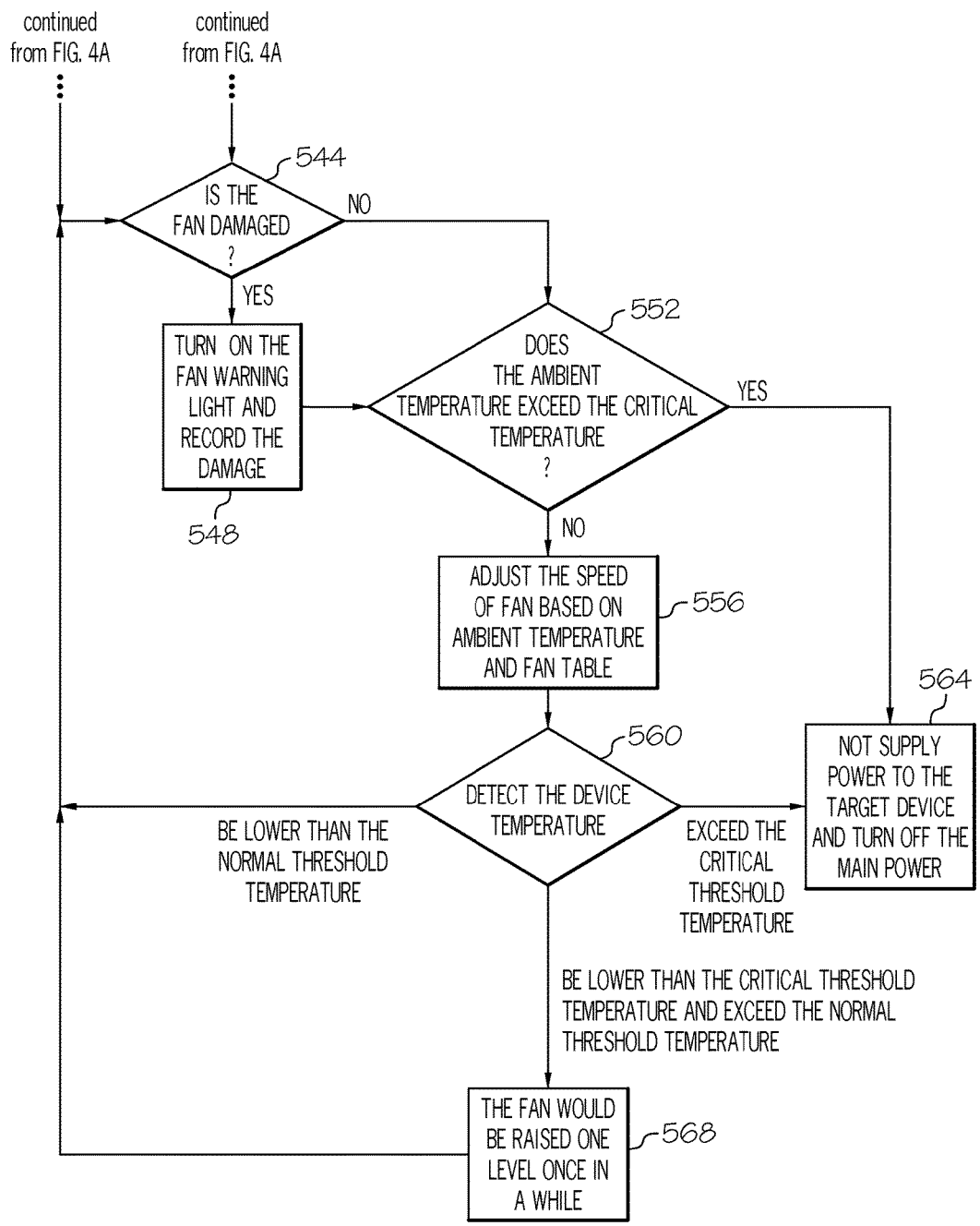

FIGS. 4A-4B relate to a method 500 for preventing over-heating of target device 220 in the information processing system 200, in accordance with a preferred embodiment of the present invention. The method 500 includes the following steps:

Step 504: the information processing system 200 is power up, and turns on the AC power.

Step 508: the management module 228 determined whether or not the information processing system 200 is configured with target device 220. In a preferred embodiment of the present invention, the target device 220 may be for example, but not limited to, a network card supporting WOL.

Step 512: if the information processing system 200 has been configured with a target device 220, the management module 228 determined whether or not the power status of the information processing system 200 is set to turn on the main power 205 of the power supply device 204. In a preferred embodiment of the present invention, based on the aforementioned definitions for power statuses, the power status of the main power 205 is set to turn on while in operational status S0; the power status of the main power 205 is set to turn off while in suspend status S3, hibernate status S4 or soft off status S5. If the power status of the main power 205 is Off, the power supply device 204 only supplies the secondary power 207, and next proceeds the step 516. However, if the power status of the main power 205 is On, then proceed to step 536. In other words, proceed to step 516 while in suspend status S3, hibernate status S4 or soft off status S5; or proceed to step 536 while in operational status S0.

Step 536: the management module 228 turns on the power of S0 fan 224, and the S0 fan 224 loads the S0 fan table and operates according to the S0 fan table. It should be noted that the following steps also employ S3/S4/S5 fan 224, in which S3/S4/S5 fan 224 and S0 fan 224 may be independently configured different fans, or may be a smart fan with VPD having different fan tables (S3/S4/S5 fan tables, S0 fan table, etc.). However, the present invention is not limited hereto. In this embodiment, S0 fan 224 and S3/S4/S5 fan 224 are integrated to employ a smart fan with VPD. Generally speaking, the speed of fan based on S3/S4/S5 fan tables is lower than the speed of fan based on S0 fan table. Fan tables for each status should be well-known to those skilled in the art.

Step 516: at this time, the power supply device 204 only supplies the secondary power 207. Based on the user's setting, the management module 228 determined whether or not the target device 220 in the information processing system 200 is set to operate. If the target device 220 is set not to operate, then proceed to step 524; if the target device 220 is set to operate, then proceed to step 520. In this embodiment, the management module 228 determined whether or not the target device 220 is set to operate from the UEFI setting of the interface firmware module 239. For example, the network card 220 supporting WOL is set to operate in a specific condition, such as S3/S4/S5.

Step 524: the management module 228 turns off the power switch 222 of the target device 220.

Step 520: the management module 228 turns on the power switch 222 of the target device 220.

Step 522: the management module 228 checks whether or not the fan 224 supports S3/S4/S5 power status, which is determined through VPD in this embodiment. If so, then proceed to step 540; if not, then proceed to step 526.

Step 526: the management module 228 turns off the power of S3/S4/S5 fan 224. In this embodiment, the power of smart fan 224 with VPD is turned off.

Step 528: the management module 228 determined whether or not the temperature of the target device 220 exceeds the predetermined critical temperature based on the device temperature sensor 238. If the temperature of the target device 220 does not exceed the critical temperature, then repeat the step 528; if the temperature of the target device 220 exceeds the critical temperature, then proceed to step 532.

Step 532: the management module 228 turns off the power switch 222 of the target device 220.

Step 540: the management module 228 turns on the power of S3/S4/S5 fan 224, and S3/S4/S5 fan 224 loads the S3/S4/S5 fan table and operates based on the S3/S4/S5 fan table. Similarly, S3/S4/S5 fan 224 and S0 fan 224 may be independently configured different fans, or a smart fan with VPD having different fan tables (S3/S4/S5 fan table, S0 fan table, etc.). However, the preset invention is not limited hereto. In this embodiment, as described above, S0 fan 224 and S3/S4/S5 fan 224 are integrated to employ a smart fan with VPD.

Step 544: the management module 228 detects whether or not the fan 224 is damaged. In this embodiment, it is provided with further over-temperature protection, but this step may also be omitted. The management module 228 determined that the smart fan 224 is damaged when the sensor (not shown) for detecting the smart fan 224 indicates the speed is zero or the speed is lower than zero PWM. If the smart fan 224 is not damaged, then proceed to step 552; if the smart fan 224 is damaged, then proceed to step 548.

Step 548: the management module 228 turns on the fan warning light (not shown), and records the damage using the event log, and then proceed to step 552. In this embodiment, the alert event generated by the sensor is stored in a set of IPMI sensor event log (SEL).

Step 552: the management module 228 detects whether or not the ambient temperature Te has exceeded the critical temperature. In this embodiment, it is provided with further over-heating protection, but this step may also be omitted. It is concerned that the device temperature Tt is typically in an approximately positive correlation with the ambient temperature Te, so as to first monitor the device temperature Tt. The management module 228 determines whether or not the ambient temperature Te exceeds the critical temperature based on the temperature detected by the ambient temperature sensor 236. If exceeded, then proceed to step 564; if not, then proceed to step 556.

Step 564: the management module 228 turns off the power switch 222 of the target device 220 to not supply power to the target device 220 and turn off the main power 205.

Step 556: the management module 228 adjusts the speed of the fan according to the ambient temperature Te and the fan table of the smart fan 224, for example the speed is 25% PWM at room temperature of 25 degrees, and 50% PWM at room temperature of 30 degrees.

Step 560: the management module 228 detects the device temperature Tt of the target device 220. In this embodiment, it is provided for further over-temperature protection, but this step may also be omitted. The management module 228 employs the device temperature sensor 238 to detect the device temperature Tt. If the device temperature Tt exceeds the critical threshold temperature, then proceed to step 564. If the device temperature Tt is lower than the normal threshold temperature, then proceed to step 544. If the device temperature Tt is lower than the critical threshold temperature and exceeds the normal threshold temperature, then proceed to step 568.

Step 568: the management module 228 makes the fan 224 raised one level once in a while. In this embodiment, the management module 228 makes the smart fan 224 raised one level once a minute or one level once ten seconds to reduce the temperature, for example.

As has been described, the present invention provides a method for effectively preventing a target device within an information processing system from being damaged caused by over-heating.

It should be noted that the aforementioned embodiment employs a network card supporting WOL for description, but those skilled in the art may easily recognize the conditions for more types of target devices, such as but not limited to the charging standby power of one device (a RAID card, a DIMM card, etc.). For example, when the power status of the main power 205 is Off and the power supply device 204 only supplies the secondary power 207, the charging standby power may supply power to the device for all kinds of operations, such as data transfer, data storage, data comparison and data backup. The present invention provides a technique to prevent the charging standby power from over-temperature. In other words, for data storage or other applications, the management module 228 may proceed further heat management according to the present invention for the charging circuit according to the UEFI setting of the interface firmware module 239. However, the present invention is also not limited hereto.

While the invention has been particularly shown and described with reference to a preferred embodiment, it will be understood by those skilled in the art that various changes in form and detail may be made therein without departing from the spirit and scope of the invention.

What is claimed is:

1. A computer-readable medium, wherein said computer-readable medium is not a signal, comprising:
   program code for determining whether or not a power status of an information processing system is set to turn on a main power of a power supply device, wherein said information processing system includes a target device, wherein said information processing system includes a fan for reducing temperature of said target device, and said fan is provided with a Vital Product Data (VPD) that stores a plurality of fan tables, each of the plurality of fan tables related to a particular power status;
   program code for, in response to a determination that said power status of said information processing system is set to turn on a main power of a power supply device while said information processing system is in an operational status S0, turning on power of the fan, loading an S0 fan table retrieved from the VPD of the fan, and operating the fan according to said S0 fan table;
   program code for, in response to a determination that said power status of said information processing system is not set to turn on a main power of a power supply device, determining whether or not said target device is set to operate based on a user's setting;
   program code for, in response to the determination that said power status of said information processing system is not set to turn on the main power of the power supply device and in response to a determination that said target device is set to operate based on said user's setting, turning on a power switch of said target device;
   program code for, in response to the determination that said power status of said information processing system is not set to turn on the main power of the power supply device and in response to a determination that said target device is not set to operate based on said user's setting, turning off said power switch of said target device;
   program code for, in response to the determination that said power status of said information processing system is not set to turn on the main power of the power supply device, in response to the determination that said target device is set to operate based on said user's setting, and in response to turning on said power switch of said target device, determining, by accessing the plurality of fan tables stored in the VPD of the fan, whether or not said fan supports an S3 (suspend status)/S4 (hibernate status)/S5 (soft off status); and
   program code for, in response to a determination, via accessing the plurality of fan tables stored in the VPD of the fan, that said fan supports said S3 (suspend status)/S4 (hibernate status)/S5 (soft off status), turning on said fan, loading an S3/S4/S5 fan table retrieved from the VPD, and operating the fan according to the S3/S4/S5 fan table.

2. The computer-readable medium of claim 1, further comprising:
   program code for, in response to a determination that said fan does not support said S3 (suspend status)/S4 (hibernate status)/S5 (soft off status), determining whether or not a temperature of said target device has exceeded a predetermined critical temperature after turning on said power switch of said target device; and program code for, in response to a determination that said temperature of said target device has exceeded a predetermined critical temperature, turning off said power switch of said target device.

3. The computer-readable medium of claim 1, wherein said main power is set to turn on when said power status is in an operational status S0, a first standby status S1 or a second standby status S2, and said main power is set to turn off when said power status is in a suspend status S3, a hibernate status S4 or a soft off status S5.

4. An information processing system comprising:
a target device having a power switch;
a power supply device, coupled to said target device; and
a management module, coupled to said power supply device, for determining whether or not a power status of said information processing system is set to turn on a main power of said power supply device, wherein said information processing system includes a fan for reducing temperature of said target device, and said fan is provided with a Vital Product Data (VPD) that stores a plurality of fan tables, each of the plurality of fan tables related to a particular power status;
in response to a determination that said power status of said information processing system is set to turn on said main power of said power supply device while said information processing system is in an operational status S0, turning on power of the fan, loading an S0 fan table retrieved from the VPD of the fan, and operating the fan according to said S0 fan table;
in response to a determination that said power status of said information processing system is not set to turn on said main power of said power supply device, determining whether or not said target device is set to operate based on a user's setting;
in response to the determination that said power status of said information processing system is not set to turn on the main power of the power supply device and in response to a determination that said target device is set to operate based on said user's setting, turning on a power switch of said target device; and
in response to the determination that said power status of said information processing system is not set to turn on the main power of the power supply device and in response to a determination that said target device is not set to operate based on said user's setting, turning off said power switch of said target device
in response to the determination that said power status of said information processing system is not set to turn on the main power of the power supply device, in response to the determination that said target device is set to operate based on said user's setting, and in response to turning on said power switch of said target device, determining, by accessing the plurality of fan tables stored in the VPD of the fan, whether or not said fan supports an S3 (suspend status)/S4 (hibernate status)/S5 (soft off status); and
in response to a determination, via accessing the plurality of fan tables stored in the VPD of the fan, that said fan supports said S3 (suspend status)/S4 (hibernate status)/S5 (soft off status), turning on said fan, loading an S3/S4/S5 fan table retrieved from the VPD, and operating the fan according to the S3/S4/S5 fan table.

5. The computer-readable medium of claim 1, further comprising program code for, in response to determining that the temperature of the target device is lower than a critical threshold temperature and exceeds a normal threshold temperature, raising the fan speed periodically.

6. A method comprising:
determining whether or not a power status of an information processing system is set to turn on a main power of a power supply device, wherein said information processing system includes a target device, wherein said information processing system includes a fan for reducing temperature of said target device, and said fan is provided with a Vital Product Data (VPD) that stores a plurality of fan tables, each of the plurality of fan tables related to a particular power status;
in response to a determination that said power status of said information processing system is set to turn on a main power of a power supply device while said information processing system is in an operational status S0, turning on power of the fan, loading an S0 fan table retrieved from the VPD of the fan, and operating the fan according to said S0 fan table;
in response to a determination that said power status of said information processing system is not set to turn on a main power of a power supply device, determining whether or not said target device is set to operate based on a user's setting;
in response to the determination that said power status of said information processing system is not set to turn on the main power of the power supply device and in response to a determination that said target device is set to operate based on said user's setting, turning on a power switch of said target device;
in response to the determination that said power status of said information processing system is not set to turn on the main power of the power supply device and in response to a determination that said target device is not set to operate based on said user's setting, turning off said power switch of said target device;
in response to the determination that said power status of said information processing system is not set to turn on the main power of the power supply device, in response to the determination that said target device is set to operate based on said user's setting, and in response to turning on said power switch of said target device, determining, by accessing the plurality of fan tables stored in the VPD of the fan, whether or not said fan supports an S3 (suspend status)/S4 (hibernate status)/S5 (soft off status); and
in response to a determination, via accessing the plurality of fan tables stored in the VPD of the fan, that said fan supports said S3 (suspend status)/S4 (hibernate status)/S5 (soft off status), turning on said fan, loading an S3/S4/S5 fan table retrieved from the VPD, and operating the fan according to the S3/S4/S5 fan table.

7. The method of claim 6, further comprising
determining whether or not a temperature of said target device has exceeded a predetermined critical temperature after turning on said power switch of said target device; and
in response to a determination that said temperature of said target device has exceeded a predetermined critical temperature, turning off said power switch of said target device.

8. The method of claim 6, wherein said main power is set to turn on when said power status is in an operational status S0, a first standby status S1 or a second standby status S2, and said main power is set to turn off when said power status is in a suspend status S3, a hibernate status S4 or a soft off status S5.

9. The method of claim 6, further comprising in response to determining that the temperature of the target device is lower than a critical threshold temperature and exceeds a normal threshold temperature, raising the fan speed according to a next duty cycle of pulse width modulation.

* * * * *